June 13, 1939. J. P. SPANG 2,162,409
MEAT SLITTING MACHINE
Filed Feb. 20, 1936 6 Sheets-Sheet 3
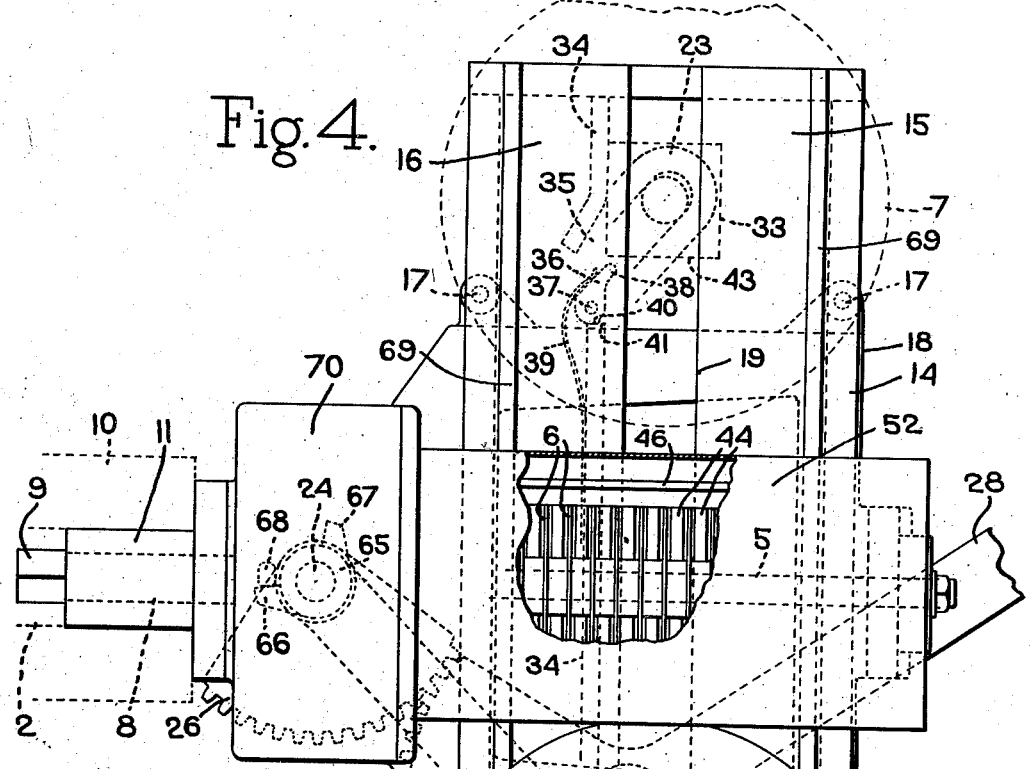
Fig. 4.
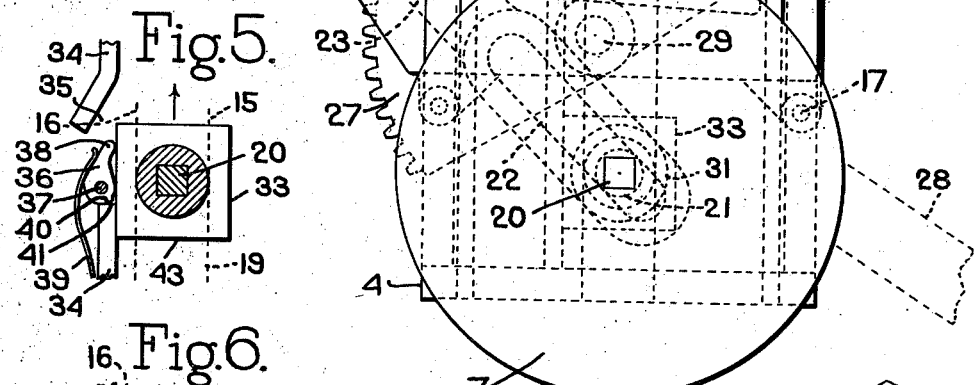
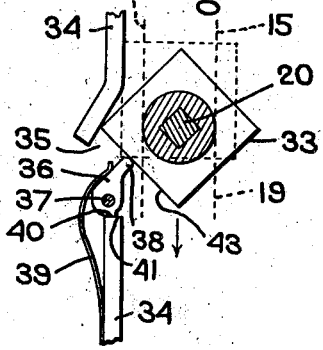
Fig. 5.
Fig. 6.
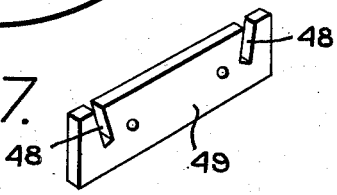
Fig. 7.
Inventor:
Joseph P. Spang
by Heard Smith & Tennant
Attys.

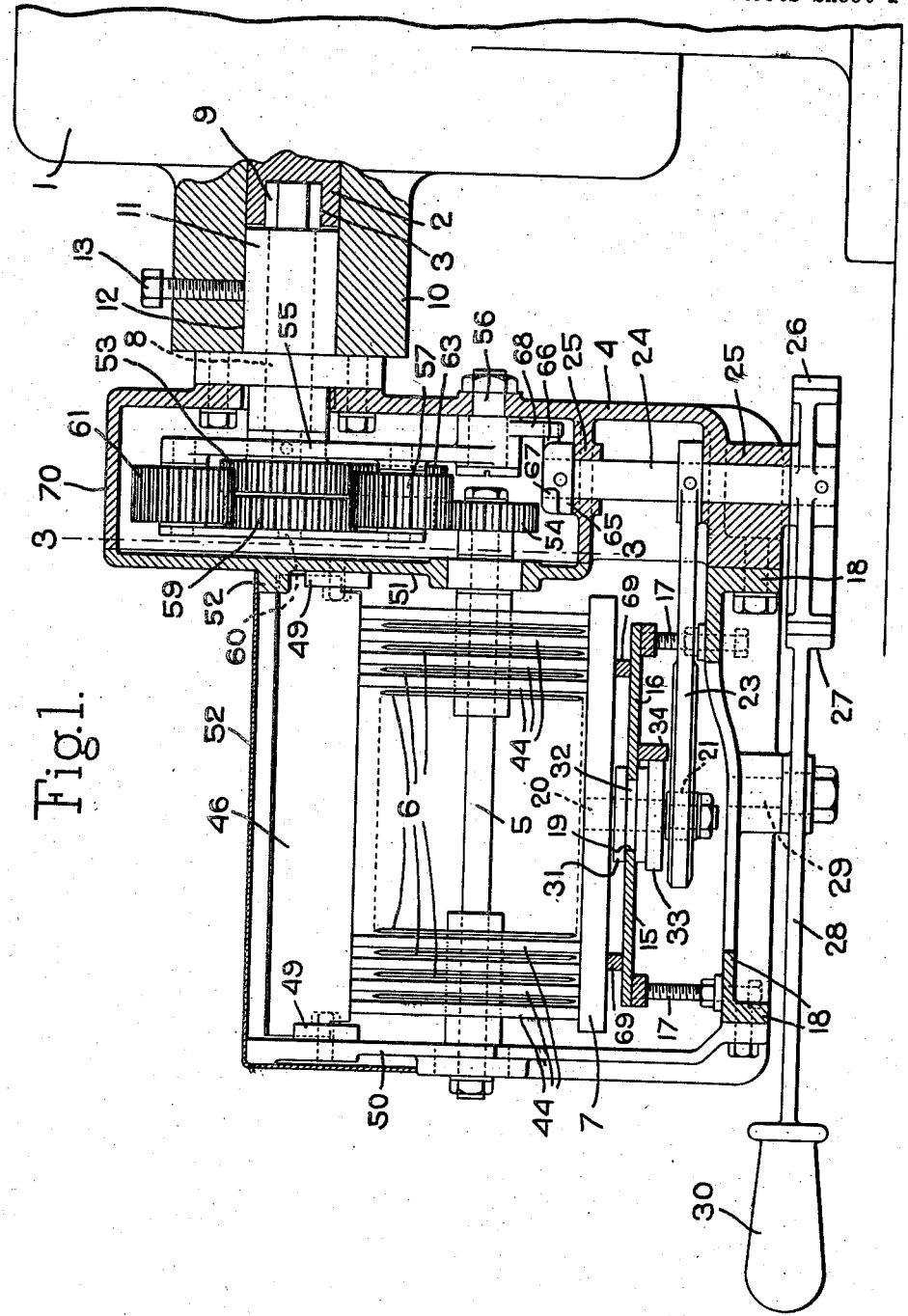

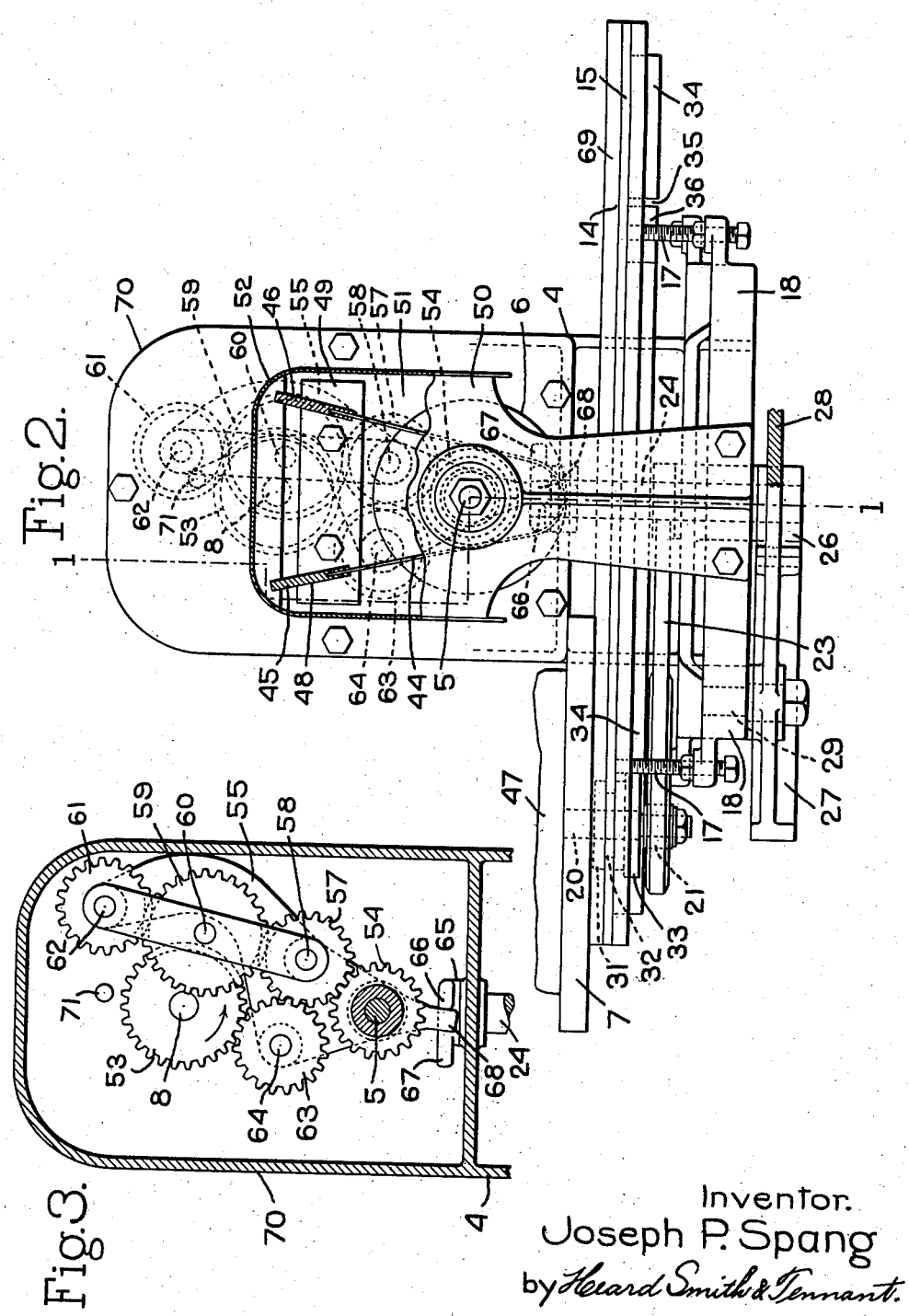

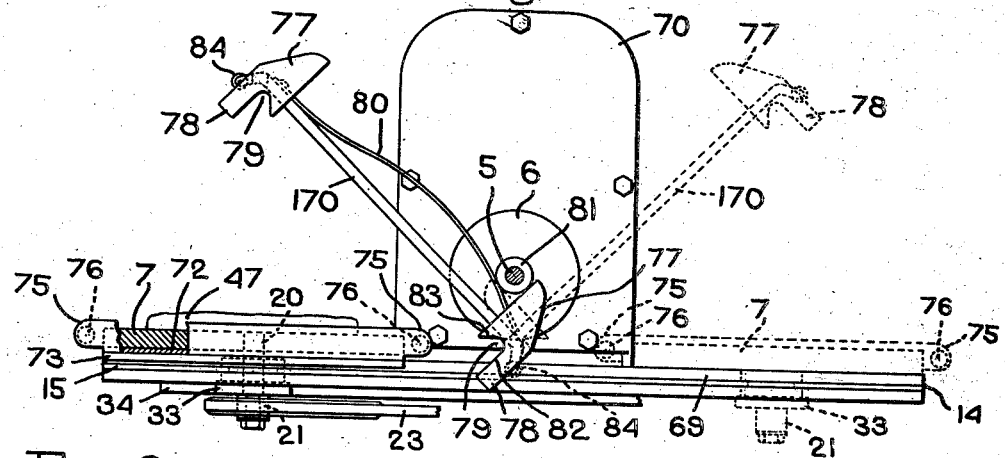
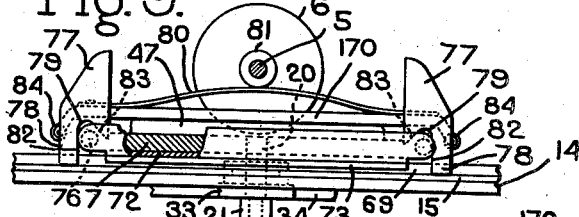
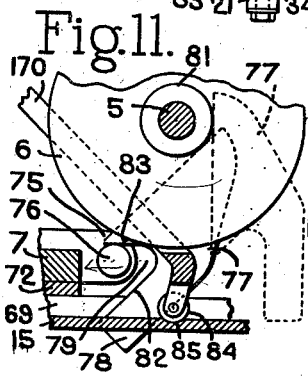
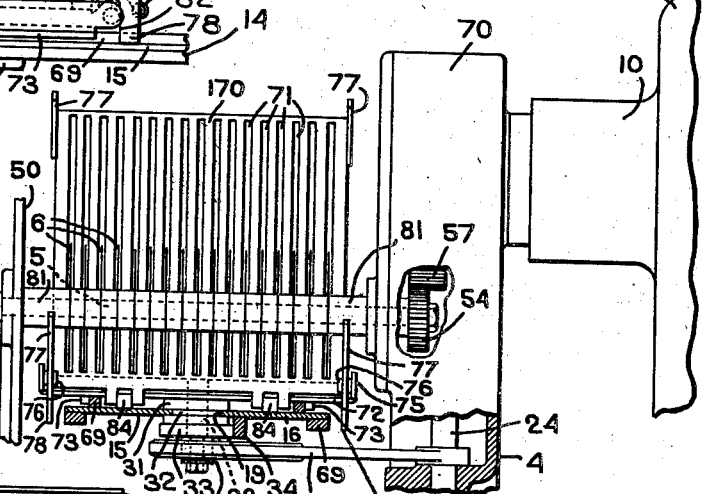
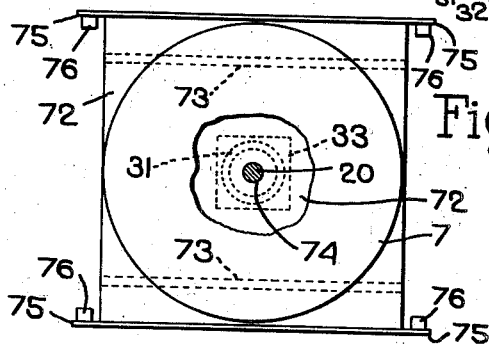

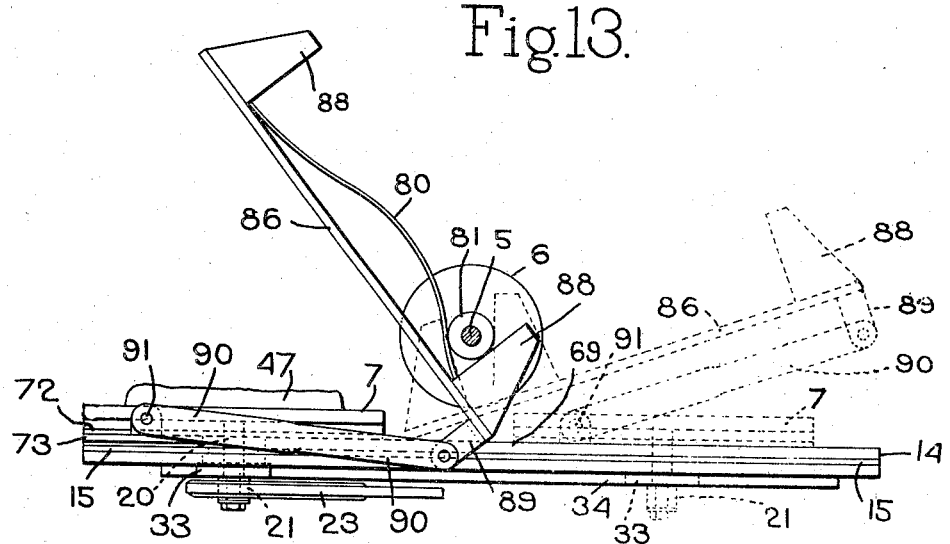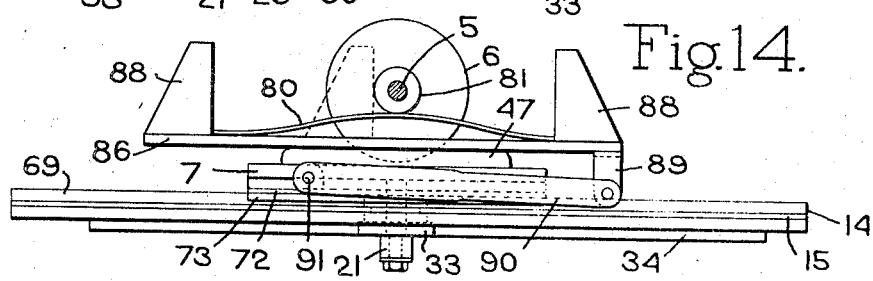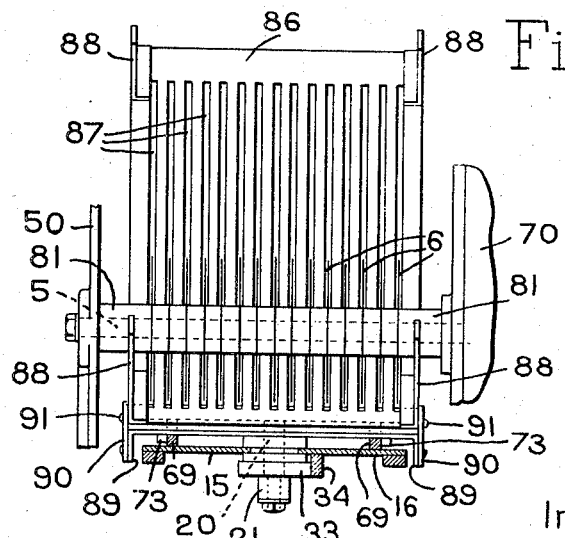

June 13, 1939.  J. P. SPANG  2,162,409
MEAT SLITTING MACHINE
Filed Feb. 20, 1936   6 Sheets-Sheet 6

Inventor.
Joseph P. Spang
by Heard Smith & Tennant.
Attys.

Patented June 13, 1939

2,162,409

UNITED STATES PATENT OFFICE 2,162,409

MEAT-SLITTING MACHINE

Joseph P. Spang, Quincy, Mass.

Application February 20, 1936, Serial No. 64,850

23 Claims. (Cl. 17—27)

This invention relates to meat-slitting machines such as are adapted to cut two groups of parallel slits in a slice of meat with the slits of one group at right angles to and crossing those of the other group.

There are now on the market various kitchen appliances in the form of a motor and a plurality of interchangeable attachments, such as a cream whip, a mixer, a coffee grinder, a vegetable slicer, etc., any one of which can be operatively connected to the motor.

It is one of the objects of my present invention to provide a meat-slicing attachment constructed to be operatively connected to a motor of such a kitchen appliance and by means of which a slice of meat can be slit or "cubed" in the manner above-described.

Some known meat-slitting devices are provided with a set of rotary slitting knives, a meat-supporting turntable movable back and forth beneath the knives together with means to turn the table between the forward and back strokes thereof so that upon the return stroke the slits will be cut in the meat at an angle to and crossing those formed in the meat during the forward stroke.

Another object of my invention is to provide a meat-slitting device of this type in which the knives are motor driven and which is provided with means for reversing the direction of rotation of the knives at the end of the movement of the meat-supporting table in either direction so that as said table moves beneath the knives with the meat thereon, said knives will always be rotating in a direction tending to feed the meat forward.

Another object of the invention is to provide improved means for giving the meat-supporting turntable its to-and-from movement and for turning the turntable about its axis between its forward and return strokes.

Another object of the invention is to provide a meat-slitting machine having a reciprocating meat-supporting table with a rocking hold-down and stripper member moving with the table and arranged to hold the meat against the table while it is being acted on by the knives and to be raised from the table at each end of the stroke.

Other objects of the invention are to improve meat-slitting machines in various particulars hereinafter set forth.

In the drawings wherein I have illustrated a selected embodiment of my invention, Fig. 1 is a sectional view through a meat-slitting device taken on the line 1—1, Fig. 2.

Fig. 2 is a view of the meat-slitting device looking from the left toward the right in Fig. 1 with part broken out.

Fig. 3 is a section on the line 3—3, Fig. 1.

Fig. 4 is a plan view of the meat-slitting attachment.

Figs. 5 and 6 are fragmentary views showing the means for turning the turntable.

Fig. 7 is a fragmentary view showing the plate for supporting the stripper.

Fig. 8 is a fragmentary view illustrating an embodiment of the invention having a rocking hold-down member, said figure showing the meat-supporting table at the end of its movement where the slice of meat is placed thereon or removed therefrom.

Fig. 9 is a fragmentary sectional view showing the hold-down member in operation holding the meat to the table while the slitting knives are acting on the meat.

Fig. 10 is a fragmentary view of the structure shown in Fig. 8 looking toward the left.

Fig. 11 is a fragmentary detail view showing the manner in which the hold-down member is raised into its inoperative position.

Fig. 12 is a plan view of the meat-supporting table and carrier.

Fig. 13 is a fragmentary view showing a different embodiment of the invention.

Fig. 14 is a view showing the hold-down member of Fig. 13 in operation.

Fig. 15 is an end view of Fig. 13.

Figure 16:
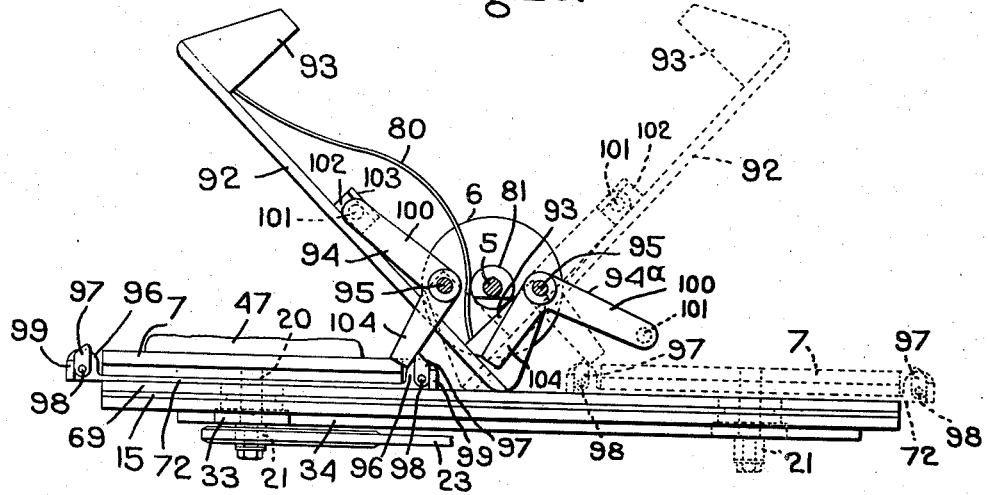
Fig. 16 is a view similar to Figs. 8 to 13 but showing still a different embodiment of the invention.

Referring to Fig. 1, 1 indicates a portion of a motor of a household appliance of that type comprising a motor element and a plurality of interchangeable attachments, any one of which may be operatively connected to the motor. The motor is shown as having a motor shaft 2 provided at its end with a coupling recess 3 having flat sides and adapted to receive the end of the driving shaft of an attachment, said end of the driving shaft having a shape to fit the recess 3.

My improved meat-slitting device comprises a suitable frame 4 in which is journalled a knife-carrying shaft 5 on which is mounted a plurality of circular slitting knives 6, said frame also carrying a meat-supporting table 7 which is adapted to be moved back and forth beneath the knives.

The meat-slitting device of this invention is also provided with a driving shaft 8 which is journalled in the frame and operatively connected to the knife-carrying shaft 5 as will be presently described. The motor is shown as having a stationary hub element or boss 10 which is formed with a recess 12 that is adapted to receive a hollow boss 11 with which the frame 4 of the meat-slitting attachment is provided. The driving shaft 8 for the knives extends through the hollow boss 11 and projects beyond the same and the motor shaft 2 terminates at the inner end of the recess 12 and is provided with the recess 3 into which the flat-sided end 9 of the driving shaft 8 fits. A set screw 13 holds the hollow boss 11 in place. There is thus provided a detachable connection between the motor 1 and the frame 4 of the meat-slitting attachment which is so constructed that when the frame is attached to the motor the driving shaft 8 of the meat-slitting attachment will be coupled to the motor shaft 2. With this arrangement the meat-slitting attachment is supported by the motor housing, but as the slitting mechanism is detachably secured to the housing it may be readily removed and replaced by some other attachment.

The frame 4 of the meat-slitting attachment supports a bed 14 on which the meat-supporting table 7 reciprocates beneath the knives 6. This bed may be constructed in any suitable way and it is herein shown as comprising two plates 15, 16 which are mounted on leveling screws 17 carried by the lower portion 18 of the frame 4, said plates being spaced from each other to provide a guiding slot 19 for the meat-supporting table 7.

In the construction shown in Figs. 1 to 4 the table 7 rests and slides on two rails 69 carried by the plates 15 and 16, and in Figs. 8 to 18 a slightly different construction is illustrated.

Manually-operative means are provided for moving the table 7 back and forth beneath the knives 6. Said table 7 is shown as having a rigid therewith a depending stud 20 which extends through the slot 19 and carries at its lower end a roll 21 operating in a slot 22 formed in an arm 23 that is fast on a vertical rock shaft 24, the latter being suitably journalled in bearings 25 formed in the frame 4 at one side of the path of movement of the table 7. The lower end of the rock shaft 24 has a gear segment 26 fast thereon and such gear segment meshes with another gear segment 27 carried on the end of an operating lever 28 that is pivoted at 29 to the under side of the frame 4. This operating lever 28 extends beyond the end of the knife shaft and is provided with a handle 30 by which it may be oscillated. Swinging movement of the handle 28 from the full line position to the dotted line position, will turn the arm 23 through the gear sector 26 and shaft 24 from the lower dotted line position Fig. 4 to the upper dotted line position, thereby moving the meat-supporting table 7 from the full line position Fig. 4 to the dotted line position and thereby carrying the table beneath the knives 6. A reverse movement of the handle 28 from the dotted line position to the full line position Fig. 4 will obviously return the table 7 from the dotted line position to the full line position Fig. 4.

The meat-supporting table 7 is in the form of a turntable, and means are provided for giving said turntable a turning movement between the forward movement thereof from the full line position to the dotted line position Fig. 4, and a return movement from said dotted line position to the full line position, so that during the return movement of the table the slits which the knives 6 cut in the meat will be at an angle to those cut during the forward movement of the table. The stud 20 of the turntable 7 has rigid therewith a guiding block 31 which has a cylindrical portion 32 of reduced diameter fitting in the slot 19 and a flat-sided guiding portion 33, the latter being herein shown as substantially square. The bedplate 16 is formed with a depending guiding rail 34 which bears against one of the flat faces of the square guiding portion 33 during the back and forth movement of the turntable, thereby preventing turning movement of the turntable about its axis 20 while said table is passing beneath the knives 6. The rear end of the guide rail is provided with an opening 35 and a dog 36 is pivotally mounted at the forward end of said opening as indicated at 37. This dog is provided with a nose 38 which is normally held in the path of movement of the block 33 by means of a spring 39. This dog 36 has a flat stop face 40 adapted to engage a cooperating stop face 41 on the guide rail 34 thereby to limit the inward swinging movement of the dog. Said dog, however, can swing freely outwardly against the action of the spring 39.

As the table 7 moves from the full line position Fig. 4 to the dotted line position the block 33 engages the nose 38 of the dog and forces the dog outwardly against the action of the spring 39. When the table 7 has reached the limit of its forward movement, which is shown in dotted lines Fig. 4, the block 33 has passed beyond the dog 36, and as soon as this occurs the spring 39 forces the dog inwardly into its operative position shown in Fig. 4. As the table 7 begins its return movement one corner of the square block 33 engages the nose 38 of the dog with the result that during the continued return movement of the turntable 7 the block 33 is given a turning movement through 90°, as shown in Fig. 6, thereby bringing the face 43 of the block 33 against the guiding rail 34. The opening 35 in the rail 34 provides for the necessary outward movement of the corner of the block as it is being turned. The turntable, therefore, is automatically given a 90° turning movement after it has been moved forwardly under the knives 6 and before it has its return movement beneath said knives 6.

A suitable hold-down and stripper device is employed to hold the meat 47 on the turntable while the knives are cutting the slits therein and to strip the meat from the knives as it passes thereunder. The hold-down and stripper shown in Figs. 1 and 2 is in the form of a plurality of flexible U-shaped strips 44 which are situated between the knives 6, there preferably being one such U-shaped strip between each two adjacent knives. The two arms of each strip are secured at their upper ends to two plates 45, 46 which are suitably supported above the knives. The stripper strips 44 are flexible and as the slice of meat 47 passes beneath the knives the U portions of the strips 44 engage the top of the slice and hold it yieldingly against the table during the passage of the latter beneath the knives. The flexible nature of the strips 44 permits them to yield to accommodate slices of different thicknesses.

The supporting plates 45, 46 are retained in grooves 48 formed in plates 49 secured to the portions 50 and 51 of the frame 4 in which the knife shaft 5 is journalled.

52 indicates a protective cover which encloses the knives 6, said cover being supported on the portion 50 of the frame and resting on a rib 52 formed on the portion 51 of the frame.

Other forms of hold-down and stripper are shown in Figs. 8 to 18 and will be presently described.

In operating a slitting machine of this type it is desirable that the direction of rotation of the knives be such that the portion of the knives operating on the meat will be traveling in the same direction as the meat so that the movement of the knives tends to feed the meat forward. Since the meat travels back and forth beneath the knives I have provided herein a novel means for rotating the knives from the motor shaft 2 which includes a reversing mechanism designed to reverse the direction of rotation of the knives after each pass of the meat beneath them. While any suitable reversing mechanism may be employed I preferably make use of a reversing mechanism which is actuated by the oscillatory movement of the shaft 24 so that as the handle 28 reaches each extreme position the direction of rotation of the knives will be automatically reversed. The driving shaft 8 which is operatively but detachably connected to the motor shaft 2 has a gear 53 thereon and the knife shaft 5 has a gear 54 fast thereon. Provision is made for driving the gear 54 from the gear 53 through either one of two trains of gearing, one train of gearing being arranged to drive the gear 54 in one direction and the other being designed to drive said gear 54 in the opposite direction. These two trains of gearing are mounted on a swinging support 55 which is pivoted to the frame 1 at 56 in axial alignment with the knife shaft 5. One train of gearing comprises the wide-faced gear 57 journalled on the frame 55 at 58 and constantly meshing with the gear 54 on the knife shaft, a first intermediate gear 59 constantly meshing with the gear 57 and journalled on the frame at 60 and a second intermediate gear 61 journalled on the swinging frame at 62 and constantly in mesh with the gear 59, said gear 61 having a wide face.

The second train of gearing comprises the gear 57 above-referred to and an intermediate gear 63 constantly meshing with the wide-faced gear 57 and journalled on the frame at 64. The construction is such that when the swinging frame 55 is moved into one extreme position, as shown in dotted lines, Fig. 2, the gear 61 is brought into mesh with the driving gear 53 on the driving shaft 8 and the intermediate gear 63 of the second train of mechanism is out of engagement with said driving gear 53.

Under these conditions the knife shaft 5 will be driven in one direction through the gear train 61, 59, 57.

When the swinging frame 55 is moved into the other extreme position, as shown in Fig. 3, the intermediate gear 61 of the first train of mechanism is disconnected from the driving gear 53 and the intermediate gear 63 of the second train of mechanism is brought into mesh with said driving gear 53, and hence under these conditions the knife shaft 5 will be driven through the second train of gearing comprising gears 53, 57 and 54 which will operate to rotate the knife shaft in a direction opposite to that from which it is rotated through the first train of gearing 61, 59, 57, 54.

The swinging of the frame 55 from one position to the other is effected by the oscillating movement of the shaft 24. Said shaft 24 is shown as having a head 65 thereon carrying two arms or projections 66, 67 and the frame 55 is formed with a depending extension 68 which is situated between these arms 66, 67. The arms are so spaced from each other that during the final turning movement of the shaft 24 in either direction one of the arms will engage the extension 68 so that during such final turning movement the frame 55 will be given its swinging movement from one extreme position to the other thereby reversing the gearing. Such reversing of the gearing takes place as the turntable reaches the end of its movement in either direction and hence when the meat is passed under the knives, whether during the forward movement of the table 7 or the reverse movement thereof, the knives will be rotating in such a direction that the portion of the knives cutting into the meat will be traveling in the same direction as the turntable. This reversing gearing is shown as enclosed in a gear casing 70.

In Figs. 8 to 18 I have shown different embodiments of the invention in which the hold-down and stripper moves back and forth beneath the knives with the table and is arranged so that it is raised from the table at each end of the reciprocating movement. With this construction the stripper is raised from the table when the latter is at the front of the machine, thereby providing plenty of space to place a slice of meat on the table, and it will also be raised from the meat when the table is at the rearward end of its movement, thereby allowing free turning movement of the turntable, said stripper being pressed against the meat when the latter is passing beneath the knives.

In the construction shown in Figs. 8 to 12 the knives 6 and operating mechanism therefor, and the turntable 7 and means for reciprocating it back and forth between the knives have the same construction as that illustrated in Figs. 1 to 4.

In this embodiment, however, the hold-down or stripper member is in the form of a rectangular grid 170 which overlies the turntable 7 and which is provided with slots 71 in which the knives 6 operate. This grid is mounted on and carried by a carriage 72 in the form of a plate which is interposed between the turntable 7 and the platform or bed 14. This carriage 72 moves back and forth on the bed 14 with the turntable 7 and is shown as resting on the rails 69, said carriage having guiding ribs 73 on its underside which engage the rails 69 and serve to guide the carriage in its reciprocating movement.

The turntable 7 is shown as resting on the top of the carriage 72, the latter having an opening 74 through which the stud 20 extends. This stud 20 has rigid therewith the block 31 which is guided in the slot 19 of the bed and which is provided with the square portion 33 cooperating with the guide rail 34, and the lower end of the stud 20 extends into a slot of the arm 23 by which the table is given its reciprocating movement, as shown in Figs. 1 to 4.

The carriage 72 is formed at each corner with an upstanding ear 75 from which extends inwardly a pin or projection 76, and the grid has at each corner an upstanding flange 77 provided with a depending extension 78 and with a recess 79 to receive the corresponding pin or projection 76. The hold-down and stripper 170 is thus carried back and forth by the carriage 72, as shown in Fig. 9. Said hold-down stripper has two leaf springs 80 on its upper side, which springs engage collars 81 on the knife shaft 5 as the table and hold-down are passing beneath the knives, said springs being so constructed that they will be compressed slightly during their passage beneath the shaft, thereby yieldingly holding the hold-down against the meat 47. After the hold-down or grid has passed beyond the knives in either direction then the pressure on the springs is relieved.

To provide for raising the hold-down from the meat at each end of the stroke of the table the upstanding flanges 77 are made of a size to engage the knife shaft 5 just before the turntable and carriage 72 reach either end of their stroke as shown in dotted lines Fig. 11. During the final movement of the carriage 72 the pins 76 on the advancing end of the carriage act against the edges 82 of the extension 78 and the pins on the trailing end of the carriage act against the faces 83 of the recesses 79 with the result that the hold-down 170 will be swung upwardly from its horizontal position shown in Fig. 9 to the raised inclined position shown in full lines Figs. 8 and 11, this moving of the grid resulting from the fact that the upper end of the flange 77 is restrained from forward movement by its engagement with the knife shaft 5, while the pins 76 are acting on the grid at points below the shaft and are, therefore, applying a turning movement to the grid or hold-down. When the grid or hold-down 170 has been swung into the inclined position shown in full lines, Figs. 8 to 11 the face 83 of the notch or recess 79 will be brought into a horizontal position and during continued movement of the turntable the pins 76 will pass out from the notches 79.

The grid is retained in its elevated position by the engagement of rolls 84 thereon in recesses or pockets 85 formed in the plates 15, 16. At this time the flange 77 is still in engagement with the collar 81, and the collar together with the pockets 85 in which the rolls 84 are seated hold the grid in its elevated inclined position. When the turntable 7 and carriage 72 reach the forward end of their movement, as shown in full lines, Fig. 8, the pins 76 will have been carried entirely out from the recesses 79 and there will then be provided ample space between the raised grid 170 and the turntable 7 to permit the operator to remove a slit slice 47 of meat from the turntable and to replace it by an unslit slice.

During the initial movement of the turntable 7 and carriage 72 toward the right, Fig. 8, after a slice 47 of meat has been placed thereon, the projections 76 will be moved into the recesses 79 at the lower end of the raised grid, and during further movement of the table and carriage the pressure of the pins 76 against the faces 82 of the depending projections 78 will move the grid toward the right so that it will be lowered onto the meat, the grid then assuming the position relative to the carriage and turntable shown in Fig. 9. As the carriage and turntable continue their movement the meat is carried beneath the knives and during this time the springs 80 are compressed by engagement with the collars 81, thereby yieldingly holding the meat against the turntable. When the carriage and turntable approach the right-hand end of their movement the hold-down is again swung upwardly away from the meat, as shown in dotted lines, Fig. 8, and said hold-down will be retained in its raised position until the turntable has received its turning movement as it starts back toward the left-hand end of the bed.

While the hold-down is thus tilted upwardly from the turntable at each end of the stroke it will be observed that at each end of the stroke it is the advancing end of the hold-down which is raised, said hold-down thus being raised from one end when it reaches the left-hand end of its movement and from the other end when it reaches the right-hand end of its movement.

In Figs. 13 to 15 I have shown still another construction for raising the hold-down at each end of the stroke. In this embodiment of the invention the hold-down member 86 is also in the form of a plate having slots 87 to receive the knives and, therefore, has a grid structure. At each corner of the hold-down there is an upstanding flange 88, said flanges cooperating with the knife shaft 5 to produce the rising or elevating movement of the grid or hold-down at each end of the stroke. The hold-down 86 has at one end two depending ears 89 to each of which is pivotally connected one end of a link 90, the other end of the link being pivotally connected to the trunnions or pins 91 extending from the carriage 72. When the carriage 72 and turntable 7 approach the left-hand end of their movement the flanges 88 at the trailing end of the hold-down 86 engage the collars 81 on the knife shaft, as shown by dotted lines Fig. 13, and during the remainder of the movement of the carriage toward the right the hold-down is held from horizontal movement and the continued movement of the pins 91 operates through the links 90 to raise the left-hand end of the hold-down, as shown in Fig. 13. As the turntable and carriage start their return movement toward the right the hold-down will be again lowered onto the meat. As the turntable and carriage approach the right-hand end of their movement the flange 88 at the then trailing end of the grid engages the collars 81 so that during the final movement of the turntable and grid into the dotted line position, Fig. 13, the thrust on the links 90 causes the grid to be swung upwardly into the dotted line position in which it is separated from the meat 47. The grid will remain in this position until the carriage and turntable have had their initial movement toward the left, during which initial movement the turntable is given a quarter turn by the means illustrated in Fig. 4. The continued movement of the carriage and turntable toward the left returns the grid onto the meat but this does not occur until after the turntable has been given its turning movement.

Figure 17:
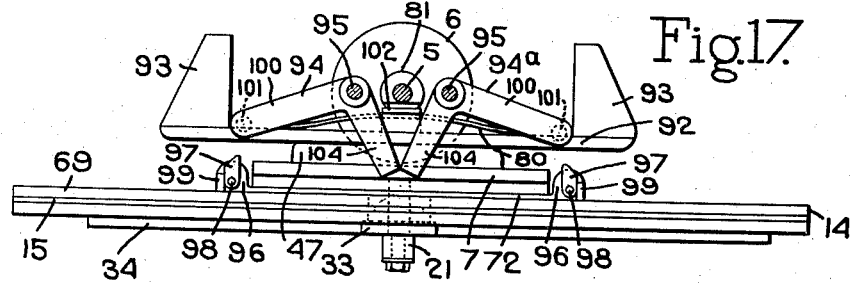
Fig. 17 is a view similar to Figs. 9 and 14 but illustrating the embodiment of the invention shown in Fig. 16.
Figure 18:
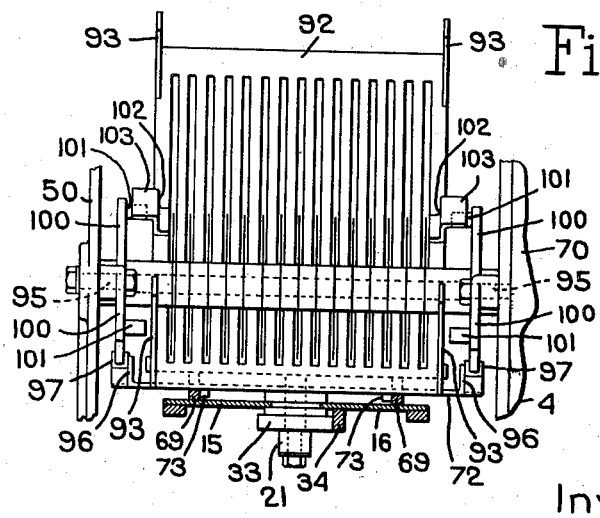
Fig. 18 is an end view of Fig. 16.

In Figs 16 to 18 there is shown still a different embodiment of the invention in which 92 indicates the hold-down and stripper, it having the upstanding flanges 93 at each end as in the construction shown in Figs. 13 to 15. In this embodiment, however, the hold-down stripper is raised at the ends of the stroke through the medium of elbow levers 94, 94a which are pivoted at 95 to the frame 4.

The carriage 72 is formed at each corner with an upstanding ear 96 to each of which is pivoted a dog 97. Each dog is free to swing inwardly about its pivot 98 but is prevented from outward swinging movement by engagement with the shoulder 99 formed on the ear 96. The arms 100 of the elbow levers 94, 94a are provided with inwardly-extending rolls or pins 101 and the grid or hold-down 92 is formed on each side intermediate of its ends with an upstanding bracket 102 having an outwardly-directed flange 103. These flanges 103 are so positioned that as the carriage with the hold-down thereon approaches either end of its stroke the flanges 103 are carried over the pins 101 of the levers 94 or 94a depending upon the direction in which the carriage is moving. As the carriage approaches the end of its movement toward the left the flanges 103 will pass over the rolls 101 of the levers 94, and while said rolls are underneath the flanges the dogs 97 on the trailing end of the carriage will engage the arms 104 of the elbow levers 94 with the result that during the final movement of the carriage toward the left the dogs 97 turn the levers 94 clockwise about their pivots, thereby raising the hold-down 92 into the full line position and separating it from the turntable a suitable distance so that the operator can remove the slitted meat therefrom and place a fresh unslitted slice thereon.

As the carriage moves from its extreme left-hand position Fig. 16 toward the right-hand position the dogs 97 on the leading end of the carriage will engage the arms 104 of the elbow levers 94a, but as these dogs are free to swing backwardly they will simply wipe under the arms 104 without actuating the latter. However, as the turntable and carriage approach the righthand end of their movement then the dogs 97 on the trailing end of the carriage, that is, the dogs 97 at the left-hand end of the carriage, engage the arms 104 of the elbow levers 94a and at this time the flanges 103 on the hold-down are located over the projections 101 on the levers 94a and the upstanding flanges 93 at the trailing end of the hold-down have been brought into contact with the collars 81 on the knife shaft 5. Hence, as the carriage completes its movement to the right the elbow levers 94a will be swung counter-clockwise about pivots 95 thereby raising the hold-down into the inclined position shown in dotted lines Fig. 16.

I claim.

1. A meat-slitting machine comprising a set of rotary knives, a meat-supporting table, means to move the table back and forth beneath the knives and power-driven knife-rotating mechanism including means to reverse the direction of rotation of the knives coincidentally with the reversal of direction of movement of the table.

2. A meat-slitting machine comprising a set of rotary knives, a meat-supporting table, means to move the table back and forth beneath the knives, a motor for rotating the knives, and driving connections between the motor and the knives including means to reverse the direction of rotation of the knives coincidentally with the reversal of direction of movement of the table.

3. A meat-slitting machine comprising a set of rotary knives, a meat-supporting table, manual means for moving the table back and forth beneath the knives, a motor for rotating the knives, and driving connections between the motor and the knives including means to reverse the direction of rotation of the knives coincidentally with the reversal of direction of movement of the table.

4. A meat-slitting machine comprising a set of rotary knives, a meat-supporting turntable, means to give the turntable a forward and backward movement beneath the knives, power-driven knife-rotating mechanism separate from the turntable moving means, and manual means operative only between each forward movement of the turntable and the successive return movement thereof to turn said turntable on its axis.

5. A meat-slitting machine comprising a set of rotary knives, a meat-supporting turntable, means to give the turntable a forward and backward movement beneath the knives, power-driven knife-rotating mechanism separate from the turntable rotating means, and means to turn the turntable on its axis during its initial movement in the return direction.

6. A meat-slitting machine comprising a set of rotary knives, a meat-supporting turntable, manual means to give the turntable a forward and backward movement beneath the knives, power-driven knife-rotating mechanism including means to reverse the direction of rotation of the knives coincidentally with the reversal of direction of movement of the turntable, and means to turn the turntable on its axis between each forward and backward movement.

7. A meat-slitting machine comprising a set of rotary knives, power-driven knife-rotating mechanism, a meat-supporting turntable, means operable independently from the knife-rotating mechanism to give the turntable a forward and backward movement beneath the knives, said knife-rotating mechanism including means to reverse the direction of rotation of the knives coincidentally with the reversal of direction of movement of the turntable, and means to turn the turntable on its axis during its initial movement in the return direction.

8. A meat-slitting machine comprising a set of rotary knives, knife-rotating mechanism, a meat-supporting table, means operable independently from the knife-rotating mechanism to move the table back and forth beneath the knives, and means actuated by the table-moving means to reverse the direction of rotation of the knives at the end of each forward or backward movement of the table.

9. A meat-slitting machine comprising a set of rotary knives, a meat-supporting table, means to give the latter a forward and backward movement beneath the knives, power-driven knife-rotating means including direction-reversing means, and means actuated by the table-moving means to actuate the direction-reversing means and thereby reverse the direction of rotation of the knives at the end of each forward and backward movement of the table.

10. A meat-slitting machine comprising a set of rotary knives, a meat-supporting turntable, means to give the latter a forward and backward movement beneath the knives, power-driven knife-rotating means including direction-reversing means, means actuated by the table-moving means to actuate the direction-reversing means and thereby reverse the direction of rotation of the knives at the end of each forward and backward movement of the turntable, and means to turn the turntable during its initial movement in the return direction.

11. A meat-slitting machine comprising a set of rotary knives, knife-rotating means, a meat-supporting table, means operable independently from the knife-rotating means to move the table back and forth beneath the knives, a hold-down member movable with the table, and means to swing the hold-down member upwardly into an inclined position when the table reaches the end of its movement in either direction.

12. A meat-slitting machine comprising a set of rotary knives, knife-rotating means, a meat-supporting table, means operable independently from the knife-rotating means to move the table back and forth beneath the knives, a hold-down member movable with the table, and means to swing the leading end of the hold-down member upwardly as the table approaches the end of its movement in either direction.

13. A meat-slitting machine comprising a set of rotary knives, knife-supporting means, a meat-supporting table, means operable independently from the knife-rotating means to move the table back and forth beneath the knives, a hold-down member movable with the table, and means actuated by the movement of the table as it approaches the end of its excursion in either direction to swing the hold-down into an inclined position with its leading end elevated.

14. A meat-slitting machine comprising a knife assembly in the form of a set of rotary knives, knife-rotating means, a meat-supporting table, means operable independently from the knife-rotating means to move the meat-supporting table back and forth beneath the knives, a hold-down member movable with the table, said hold-down member having at each end an upstanding portion adapted to engage the knife assembly as the table approaches the end of its movement, and means actuated by the final movement of the table in either direction to tilt the hold-down member into an inclined position with its leading end elevated.

15. A meat-slitting machine comprising a knife assembly in the form of a set of rotary knives, knife-rotating means, a meat-supporting table, means operable independently from the knife-rotating means to move the table back and forth beneath the knives, a carriage movable with the table, a hold-down member having an upstanding portion at each end adapted to engage the knife assembly as the table and carriage approach the end of their movement in either direction, and a connection between said carriage and said hold-down member by which the hold-down member is moved with the carriage beneath the knives and is tilted into an inclined position when either of said upstanding portions engages the knife assembly.

16. A meat-slitting machine comprising a set of rotary knives, knife-rotating means, a meat-supporting table beneath the knives, means separate from the knife-rotating means to move the table back and forth beneath the knives, and means actuated by the table-moving means to reverse the direction of rotation of the knives coincidently with the reversal of direction of movement of the table.

17. A meat-slitting machine comprising a set of rotary knives, a meat-supporting table, means to move the table back and forth beneath the knives, and knife-rotating mechanism operable independently of the table-moving means and including means to reverse the direction of rotation of the knives coincidently with the reversal of direction of movement of the table.

18. A meat-slitting machine comprising a motor having a motor shaft, a meat-slitting attachment separable from the motor but adapted to be detachably supported thereby, said attachment including a set of rotary slitting knives, a driving shaft therefor adapted to be operatively but detachably coupled to the motor shaft, a meat-supporting table movable back and forth beneath the knives, and means operable independently from the knife-rotating means for giving the table its back and forth movement.

19. A meat-slitting machine comprising a motor having a boss provided with a recess and also having a motor shaft terminating at the bottom of the recess, a supporting frame having a hollow boss adapted to be removably received in said recess, a set of rotary slitting knives mounted on the frame, a driving shaft journalled in the frame and extending through and projecting beyond said hollow boss, said driving shaft and motor shaft having interengaging portions by which they are detachably coupled when the hollow boss of the frame is positioned in the boss of the motor, driving connections between the driving shaft and the knives, a meat-supporting table beneath the knives, and means to move said table back and forth.

20. A meat-slitting machine comprising a motor having a boss provided with a recess and also having a motor shaft terminating at the bottom of the recess, a supporting frame having a hollow boss adapted to be removably received in said recess, a set of rotary slitting knives mounted on the frame, a driving shaft journalled in the frame and extending through and projecting beyond said hollow boss, said driving shaft and motor shaft having interengaging portions by which they are detachably coupled when the hollow boss of the frame is positioned in the boss of the motor, driving connections between the driving shaft and the knives, a meat-supporting table beneath the knives, and means operable independently from the knives for moving the table back and forth.

21. A meat-slitting machine comprising a frame, a set of rotary knives mounted therein, means to rotate the knives, a meat-supporting table movable back and forth beneath the knives and having a depending stud, a swinging arm connected to said stud, and means to give the arm a swinging movement thereby to move the table back and forth beneath the knives.

22. A meat-slitting machine comprising a frame, a set of rotary knives mounted therein, means to rotate the knives, a turntable movable back and forth beneath the knives and having a depending stud, a swinging arm connected to said stud, means to give the arm a swinging movement thereby to move the turntable back and forth beneath the knives, and means for turning the turntable during its reciprocating movement.

23. A meat-slitting machine comprising a set of rotary knives, knife-rotating means, a meat supporting table turnable about an axis perpendicular thereto, means operative independently from the knife rotating means to give the table a forward and backward movement beneath the knives, means to give the table a turning movement about its axis after it passes the knives on its forward movement and before it reaches the knives on its backward movement, a tilting hold-down member movable with the table, and means to swing the hold-down member upwardly into an inclined position when the table reaches the end of its backward movement.

JOSEPH P. SPANG.

CERTIFICATE OF CORRECTION.

Patent No. 2,162,409.　　　　　　　　　　　　　　　June 13, 1939.

JOSEPH P. SPANG.

It is hereby certified that error appears in the printed specification of the above numbered patent requiring correction as follows: Page 5, first column, line 72, claim 4, strike out the word "manual" and insert the same before "means" in line 69, same claim; page 6, first column, line 6, claim 13, for "knife-supporting" read knife-rotating; and that the said Letters Patent should be read with this correction therein that the same may conform to the record of the case in the Patent Office.

Signed and sealed this 8th day of August, A. D. 1939.

eal)